United States Patent [19]

Harnsberger

[11] 4,073,342
[45] Feb. 14, 1978

[54] SAND CONSOLIDATION METHOD

[75] Inventor: Bobby G. Harnsberger, Houston, Tex.

[73] Assignee: Texaco Inc., New York, N.Y.

[21] Appl. No.: 753,761

[22] Filed: Dec. 23, 1976

[51] Int. Cl.$^2$ .................... E21B 33/138; E21B 43/02
[52] U.S. Cl. ................................................. 166/295
[58] Field of Search ............... 166/295, 292, 294, 276; 61/36 B, 36 C

[56] References Cited

U.S. PATENT DOCUMENTS

| | | | |
|---|---|---|---|
| 2,019,908 | 11/1935 | Kennedy et al. | 166/292 |
| 2,267,855 | 12/1941 | Chamberlain | 166/292 |
| 3,055,426 | 9/1962 | Kerver et al. | 166/293 |
| 3,087,542 | 4/1963 | Becker et al. | 166/292 |
| 3,199,590 | 8/1965 | Young | 166/295 |
| 3,221,505 | 12/1965 | Goodwin et al. | 166/292 X |
| 3,404,735 | 10/1968 | Young et al. | 166/295 |
| 3,437,145 | 4/1969 | Johnson et al. | 166/295 |
| 3,548,944 | 12/1970 | Hess | 166/295 |
| 3,743,019 | 7/1973 | Totty | 166/295 X |
| 3,776,311 | 12/1973 | Carnes et al. | 166/295 |

OTHER PUBLICATIONS

Hess et al., "Chemical Method for Formation Plugging", Journal of Petroleum Technology, 5-1971, pp. 559–561, 563, 564.

Young, "Consolidation Technique in Clayey Sands Boosts Flow Rate," The Oil and Gas Journal, 9-18-67, pp. 107–109.

*Primary Examiner*—Stephen J. Novosad
*Attorney, Agent, or Firm*—Thomas H. Whaley; Carl G. Ries; James F. Young

[57] ABSTRACT

Method for the treatment of unconsolidated sandy formations to stabilize such formation comprising the sequential steps of:

1. Injecting a liquid hydrocarbon containing a minor amount of a water wetting nonionic surface active agent and, from about 0.5 to about 3% of water, into said formation to remove any excess water present therein without completely drying the sand, or optionally to water wet an essentially water free sand formation;

2. Injecting a first treating solution or suspension composed of from about 3 to 20% by volume of a inorganic silicon halide and 80 to 97% by volume of hydrocarbon solvent into the sand formation being consolidated;

3. Injecting a liquid hydrocarbon into said sand formation to effect removal of any excess inorganic silicon halide from the area being consolidated;

4. Injecting a second treating solution composed of from about 3 to about 20% by volume of furfuryl alcohol and from about 80 to about 97% by volume of a high in aromatics (80% or more) petroleum fraction, optionally including from about 0.5 to about 1.5% by volume of a silane bonding agent, into said formation and contacting the first treated sand formation with said second treating solution; 5. Maintaining said inorganic silicon halide and said furfuryl alcohol components of said first and second treating solutions in contact with said sand to be consolidated for a period sufficient to polymerize said components and form an oil permeable but sand impermeable barrier therein.

10 Claims, No Drawings

SAND CONSOLIDATION METHOD

FIELD OF THE INVENTION

The present invention relates to the treatment of permeable underground formations. More particularly, the present invention relates to a method of treating permeable underground oil and/or gas containing formations to stabilize the sandy portion thereof.

The recovery of fluids such as gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the borehole results in a loss of these fluids to the producer or so decreases the rate of oil recovery from the well as to cause the well to be shutdown because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the sand particles are very abrasive.

DESCRIPTION OF THE PRIOR ART

Many attempts have been made heretofore to prevent or decrease the flow of undesirable sand particles from the formation into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition, these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods and the time required for resin polymerization is often rather lengthy at low temperatures.

It is known from U.S. Pat. No. 3,055,426 to employ a liquid halide of silicon as a consolidating material in an incompetent underground formation containing sufficient water therein to hydrolyze said silicon halide. However, such consolidations have not been too satisfactory since the silicon halides have poor water resistance.

It is further known from U.S. Pat. No. 3,199,590 to employ furfuryl alcohol resins as well as furfuryl alcohol, alone or in admixture, as consolidating materials in an incompetent underground formation.

SUMMARY OF THE INVENTION

By the method of the present invention one is able to treat effectively the underground formation to be stabilized in a rapid and efficient manner while minimizing the disadvantages of these prior art methods, both mechanical and chemical.

One object of the present invention is to provide an improve method of treating underground sand containing formations to stabilize the incompetent formation. An additional object is to provide a fluid permeable consolidated formation sand between the loose formation sand and the well bore so as to prevent or to minimize the flow of unconsolidated sand particles therethrough while maximizing the flow of desired fluids and particularly petroleum hydrocarbons therethrough.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises the sequential steps of:

1. Injecting a liquid hydrocarbon normally containing a minor amount of a water wetting nonionic surface active agent and from about 0.5 to about 3% of water into said formation to remove any excess water present therein or optionally to water wet an essentially water free sand formation;

2. Injecting a first treating solution or suspension composed of from about 3 to 20% by volume of a inorganic silicon halide and 80 to 97% by volume of a hydrocarbon solvent into the sand formation being consolidated;

3. Injecting a liquid hydrocarbon into said sand formation to effect removal of any excess inorganic silicon halide from the area being consolidated;

4. Injecting a second treating solution composed of from about 3 to about 20% by volume of furfuryl alcohol and from about 80 to about 97% of an aromatic petroleum solvent, optionally including from about 0.5 to about 1.5% by volume of a silane bonding agent, into said formation and contacting the first treated sand formation with said second treating solution;

5. Maintaining said inorganic silicon halide and said furfuryl alcohol components of said first and second treating solutions in contact with each other and in said sand to be consolidated for a period sufficient to polymerize said components and form an oil permeable but sand impermeable barrier therein. The resultant consolidated sand serves to prevent or to reduce materially the flow of the unsolidated sandy particles therethrough while permitting the flow of desirable formation fluids at a substantially unimpaired rate.

In carrying out the method of the present invention it is desirable to first remove any excess water (over about 5 to 10% by volume depending on porosity) present in the formation since any excess water may prevent the subsequently employed treating solutions from reaching the consolidation area and polymerizing therein.

The treating solutions are pumped down the well bore under sufficient pressures to force the solutions into the unconsolidated formation adjacent to or in reasonable proximity to the well bore. When the solutions are suitably placed in the formation about the consolidation area the well is shut in for the time required to effect polymerization of the polymerizable components, the inorganic silicon halide and the furfuryl alcohol, aided if present by the silane bonding agent.

After polymerization and hardening, there is formed a fluid permeable consolidated sand that prevents or decreases the movement of sand particles therethrough into the well bore. Thereafter the well can be equipped for production. The formation fluids can be recovered therefrom by permitting these fluids to pass through the resulting well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating solutions from passing into the non-isolated portions of the well and also to permit build-up of sufficient pressures on the said solutions to force same through the perforations and into the formation without plugging up the well bore.

The treating solutions useful in the method of the present invention must meet certain specific requirements.

In the initial step (1) of the method of the present invention, the liquid hydrocarbon can be crude oil or a fraction thereof such as kerosene or diesel oil, which are commonly used, although any liquid hydrocarbon could be used provided it does not damage the formation. In addition, these preflushing materials must be capable of being compatable with the small volume of water required to wet a dry sand to be consolidated and further compatable with the optional surface active agent that may be present.

The amount of water that may be present in the liquid hydrocarbon is designed to provide sufficient water to effect hydrolysis of the silicon halide component used in the first treating solution. The concentration of water can vary from 0.5% in a water wet formation up to about 3% by volume in a essentially water free area to be consolidated.

The optional surface active agent that may be present in the liquid hydrocarbon is an oil soluble nonionic water wetting surfactant. Suitable nonionic surface active agents include the material known by the trade name, Pluronic L-64, a polyoxypropylene polyoxyethylene condensate obtained by the condensation of propylene oxide with propylene glycol and the addition of ethylene oxide to both ends of the polyoxypropylene base. This material has a hydrophilic-lipophilic balance of 15.0 and an average molecular weight of about 2900.

Another suitable oil soluble surface active agent is the nonionic surfactant known by the Trade Name Hyflo, and described more fully in U.S. Pat. No. 2,946,747, as an oil soluble amine salt of an alkylated aromatic sulfonic acid and a polyether synergizing component capable of reducing the surface tension of water by at least 25 dynes/cm$^2$ and having an average M.W. of at least 1200 attributable to oxyalkylene groups having 2 to 4 carbon atoms, the relative proportion of the salt being 3 to 20 times by weight of the synergizing component. A preferred surfactant is the above described material Hyflo. The nonionic surfactant is present in an amount of from 0.17% up to about 1% by volume of the liquid hydrocarbon.

The first treating solution of the present invention contains from about 3 to 20% by volume of an inorganic halide of silicon, preferably silicon tetrahalide. A particularly preferred concentration range is from about 5 to 15%, and most effective results are obtained at a concentration of about 10–12% by volume.

The second component of the first treating solution is a petroleum hydrocarbon solvent for the silicon halide such as a kerosene or diesel oil fraction of a petroleum crude oil. This petroleum hydrocarbon solvent is used in an amount of from about 80 to about 97% by volume, preferably from about 85 to 95%, and is particularly effective when present in amounts of from about 88 to 90% by volume.

In the third step of the method of this invention one can employ the same petroleum hydrocarbon as used in the preceding second step as the solvent component.

This third step is necessary to remove any excess inorganic silicon halide from the consolidation area.

The second treating solution contains furfuryl alcohol, in an amount that is the same as the concentration of the inorganic silicon halide in the first treating step. This like quantity of furfuryl alcohol provides sufficient of the alcohol component to the area being consolidated while preventing an insufficient quantity being used. The broad range of this component can vary from 3 to 20% by volume preferably 5 to 15% and particularly about 10 to 12%.

The carrier medium for the furfuryl alcohol component is a high in aromatics (80% or more), petroleum fraction obtained as a naphthalene petroleum fraction from a topped catalytic bottoms fraction having an IBP of about 350° F. and an EP of about 750° F., an API Gravity of about 20° C., and a Flash Point of above about 150° F. (COC).

This high in aromatics fraction is used in an amount of from about 80 to 97% by volume, preferably from about 85 to about 95%, especially about 88–90%.

A desirable component of the second treating solution position is a silane bonding agent, which imparts additional strength to the consolidated sand formation. It functions to improve surface adhesion of the sand grains, thus improving the compressive strength thereof. While any of the known silane bonding or coupling agents can be used, it is preferred to employ a particular silane, namely gamma-glycidoxypropyl - trimethoxysilane in the composition. A suitable quantity thereof may vary from about 0.5 to about 1.5% by volume, preferably from about 0.7–1.3% When the silane bonding agent is present in the second treating solution in the above indicated amounts, the quantity of the carrier medium component is correspondingly decreased a like amount. After placement of the second treating solution in the consolidate area the well is shut in for the time required to effect polymerization of the furfuryl alcohol component and the silicon halide component and the resultant formation of a fluid permeable barrier therein. The temperature of the formation aids in polymerization. Typical formation temperatures that are encountered vary from about 75° F. up to about 300° F., usually up to about 250° F. Under such temperatures, polymerization takes place in about 24 hours at 75° F., or at 180° F. in about 30 minutes.

In the practice of the method of the invention injection of the various treating solutions may vary from about one to about three gallons per minute per perforation. An injection rate of from about 1.5 to 2.5 gallons is preferred.

Following is a description by way of example of the method of the present invention.

EXAMPLE 1

A one inch in diameter by 6 inches long glass tube was filled with a dry Oklahoma #1 sand having a known permeability of about 12 darcies.

1. The sand was packed in the tube by pressurized water.
2. Any excess water was removed from the sand by passing therethrough a liquid hydrocarbon, such as diesel oil or an aromatic hydrocarbon solvent as defined above, containing 1-2% water from about 0.1 to 1% by volume of a water wetting oil soluble nonionic surfactant such as the material known by the Trade Name Hyflo.
3. The water wet sand thereafter was treated with 5% by volume of silicon tetrachloride in kerosene. The treating solution was forced the through the sand at an injection rate of 3 cc. per minute.
4. The excess treating solution of step (3) was removed by treating the sand with aromatic hydrocarbon solvent as defined above.
5. The treated sand was contacted with a 15% by volume furfuryl alcohol in a high in aromatics (80% or more) petroleum fraction obtained as a naphthalene petroleum fraction from a topped catalytic bottoms fraction having an IBP of about 350° F. and an EP of about 750° F., an API Gravity of about 20° C. maximum, and a Flash Point of above about 150° F., (COC).
6. The treated sand packed tube was allowed to set 30 minutes at 80° C. (176° F.) to permit polymerization to be completed. Tests on the consolidated sand showed average compressive strengths of 600 to about 2300 psi.

Its stability to low pressure steam over a two to three week period was evaluated. Little or no loss in compressive strength was found. It was comparable to that of commercial sand consolidation compositions. The steam was saturated steam at 230° F., and its flow rate was about 20 cc/min (on basis of condensed water). Steam was used as the test medium to accelerate this stability test.

Obviously, many modifications and variations of the invention as hereinbefore set forth may be made without departing from the spirit and scope thereof and therefore only such limitations should be imposed as are indicated in the appended claims.

I claim:

1. A method of treating an oil-containing incompetent formation penetrated by a well bore to prevent the movement of unconsolidated sand particles from said incompetent formation to the well bore as the oil is recovered from said formation which comprises the sequential steps of:
    1. Injecting a liquid hydrocarbon containing a minor amount of a water wetting nonionic surface active agent and from about 0.5 to about 3% of water into said formation to remove any excess water present therein;
    2. Injecting a first treating solution composed of from about 3 to 20% by volume of a inorganic silicon halide and 80 to 97% by volume of a hydrocarbon solvent into the sand formation being consolidated;
    3. Injecting a liquid hydrocarbon into the sand formation to effect removal of any excess inorganic silicon halide from the area being consolidated;
    4. Injecting a second treating solution composed of from about 3 to about 20% by volume of furfuryl alcohol and from about 80 to 97% of a high in aromatics (80% or more) petroleum fraction into said consolidation area and permitting said second treating solution to contact said first treating solution;
    5. Shutting in said well for a period sufficient to effect polymerization and curing of the polymerizable components of said first and second treating solutions, and formation of an oil permeable but sand impermeable barrier therein.

2. Method as claimed in claim 1 wherein the liquid hydrocarbon employed in the first step is selected from the group consisting of crude oil, kerosene and diesel oil, including mixtures.

3. Method as claimed in claim 1 wherein said nonionic surfactant active agent is present in an amount of from about 0.5 to 1% by volume.

4. Method as claimed in claim 1 wherein said inorganic halide of silicon is present in the hydrocarbon solvent in an amount of from about 10% to 20% by volume.

5. Method as claimed in claim 1 wherein said inorganic halide of silicon is silicon tetrachloride.

6. Method as claimed in claim 1 wherein a concentration of from about 10 to 15% by volume of furfuryl alcohol is used in the second treating solution.

7. Method as claimed in claim 6 wherein the furfuryl alcohol concentration is from about 10 to 12% by volume.

8. Method as claimed in claim 1 wherein the high in aromatics (80% or more) petroleum fraction has an API Gravity of about 20° C., max., a boiling point range of from about 350° to about 750° F., and a Flash Point (COC) of a minimum of 150° F., and being a naphthalene petroleum fraction of a topped catalytic reformate bottoms cut.

9. Method as claimed in claim 1 wherein the shut in time varys from about 24 hours at 75° to about 30 minutes at about 180° F.

10. Method as claimed in claim 1 wherein from about 0.5 to 1.5% by volume of gamma-glycidoxyproplytrimethoxy-silane is present in said second treating solution.

* * * * *